(12) United States Patent
Height et al.

(10) Patent No.: US 7,887,775 B2
(45) Date of Patent: *Feb. 15, 2011

(54) METHOD AND APPARATUS FOR SYNTHESIZING FILAMENTARY STRUCTURES

(75) Inventors: Murray J. Height, Somerville, MA (US); Jack B. Howard, Winchester, MA (US); John B. Vandersande, Newbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 570 days.

This patent is subject to a terminal disclaimer.

(21) Appl. No.: 11/853,921

(22) Filed: Sep. 12, 2007

(65) Prior Publication Data

US 2009/0311167 A1    Dec. 17, 2009

Related U.S. Application Data

(63) Continuation of application No. 10/389,002, filed on Mar. 14, 2003, now Pat. No. 7,335,344.

(51) Int. Cl.
*D01C 5/00* (2006.01)
(52) U.S. Cl. ..................... 423/447.3; 977/843
(58) Field of Classification Search .............. 423/447.1, 423/447.2, 447.3; 977/742–754, 842–848
See application file for complete search history.

(56) References Cited

U.S. PATENT DOCUMENTS

| | | | |
|---|---|---|---|
| 5,273,729 A * | 12/1993 | Howard et al. | 423/445 B |
| 5,985,232 A * | 11/1999 | Howard et al. | 423/447.3 |
| 6,156,256 A | 12/2000 | Kennel | |
| 6,162,411 A * | 12/2000 | Howard et al. | 423/445 B |
| 6,256,996 B1 | 7/2001 | Ghoshal | |
| 6,333,016 B1 * | 12/2001 | Resasco et al. | 423/447.3 |
| 6,423,583 B1 | 7/2002 | Avouris et al. | |
| 2003/0004058 A1 | 1/2003 | Li et al. | |
| 2003/0143151 A1 * | 7/2003 | Diener et al. | 423/447.3 |
| 2003/0147802 A1 * | 8/2003 | Smalley et al. | 423/447.3 |

FOREIGN PATENT DOCUMENTS

| | | |
|---|---|---|
| WO | WO-0138219 A1 | 5/2001 |
| WO | WO-03021015 A1 | 3/2003 |
| WO | WO-03021018 A1 | 3/2003 |
| WO | WO-03050040 | 6/2003 |

OTHER PUBLICATIONS

Vander Wal, et al., Diffusion flame synthesis of single-walled carbon nanotubes, Chemical Physics Letters 2000; 323: 217-223.*

(Continued)

*Primary Examiner*—Stanley S. Silverman
*Assistant Examiner*—Daniel C. McCracken
(74) *Attorney, Agent, or Firm*—Wilmer Hale LLP

(57) ABSTRACT

Method and apparatus for producing filamentary structures. The structures include single-walled nanotubes. The method includes combusting hydrocarbon fuel and oxygen to establish a non-sooting flame and providing an unsupported catalyst to synthesize the filamentary structure in a post-flame region of the flame. Residence time is selected to favor filamentary structure growth.

31 Claims, 8 Drawing Sheets

OTHER PUBLICATIONS

Vander Wal, et al., Flame and Furnace Synthesis of Single-Walled and Multi-Walled Carbon Nanotubes and Nanofibers, J. Phys. Chem. B. 2001; 105: 10249-10256.*
Height, et al., Flame Synthesis of Carbon Nanotubes, Materials Research Society Symposium Proceedings 2003, Nanotube-Based devices Symposium, San Francisco, CA, 22-25, vol. 772, 2003 pp. 55-61, Apr. 2003, XP008032429.*
Greico, Fullerenes and Carbon Nanostructures Formation in Flames, Doctoral Thesis, Massachusetts Institute of Technology, Cambridge, MA 1999.*
Goel, Combustion synthesis of fullerenes and fullerenic nanostructures, Doctoral Thesis, Massachusetts Institute of Technology, Cambridge, MA, 2002.*
U.S. Appl. No. 12/024,177, filed Feb. 1, 2008.*
A Bachtold, P Hadley, T Nakanishi, C Dekker: Logic circuits with carbon nanotube transistors. Science 294 (2001) 1317-20.
A Goel, P Hebgen, JB Vander Sande, JB Howard: Combustion synthesis of fullerenes and fullerenic nanostructures. Carbon 40 (2002) 177-82.
A Goel: Combustion synthesis of fullerenes and fullerenic nanostructures, Doctoral, Massachusetts Institute of Technology, Cambridge, MA, 2002.
A Koshio, M Yudasaka, S Iijima: Metal-free production of high-quality multi-wall carbon nanotubes, in which the innermost nanotubes have a diameter of 0.4nm. Chemical Physics Letters 356 (2002) 595-600.
A Thess, R Lee, P Nikolaev, H Dai, P Petit, J Robert, C Xu, YH Lee, SG Kim, AG Rinzler, DT Colbert, GE Scuseria, D Tomanek, JE Fischer, RE Smalley: Crystalline ropes of metallic carbon nanotubes. Science 273 (1996) 483-87.
AA Talin, KA Dean, JE Jaskie: Field emission displays: a critical review. Solid-Sate Electronics 45 (2001) 963-76.
AC Dillon, MJ Heben: Hydrogen storage using carbon adsorbents: past, present and future. Applied Physics A 72 (2001) 133-42.
AS Feitelberg, JP Longwell, AF Sarofim: Metal enhanced soot and PAH formation. Combustion and Flame 92 (1993) 241-53.
B Rajesh, V Karthik, S Karthikeyan, K Ravindranathan Thampi, J-M Bonard, B Viswanathan: $Pt-WO_3$ supported on carbon nanotubes as possible anodes for direct methanol fuel cells. Fuel 81 (2002) 2177-90.
BI Yakobson, RE Smalley: Fullerene nanotubes: $C_{1,000,000}$ and beyond. American Scientist 85 (1997) 324-37.
BJ Landi, RP Rafaelle, MJ Heben, JL Alleman, W VanDerveer, T Gennett: Single-wall carbon nanotube-nafion composite actuators. Nano Letters 2 (2002) 1329-32.
Bohm, H. et al., "The Influence of Pressure and Temperature on Soot Formation in Premixed Flames," Twenty-Second Symposium (International) on Combustion/The Combustion Institute, 1988/pp. 403-411.
C Janzen, P Roth: Formation and characteristics of $Fe_2O_3$ nano-particles in doped low pressure $H_2/O_2/Ar$ flames. Combustion and Flame 125 (2001) 1150-61.
CKW Adu, GU Sumanasekera, BK Pradhan, HE Romero, PC Eklund: Carbon nanotubes: a thermoelectric nano-nose. Chemical Physics Letters 337 (2001) 31-35.
CM Megaridis, RA Dobbins: Morphological description of flame-generated materials. Combustion Science and Technology 71 (1990) 95-109.
Colomer, J.-F. et al., "Characterization of single-wall carbon nanotubes producted by CCVD method," Chemical Physics Letters 345 (2001) 11-17, Sep. 7, 2001.
D Venegoni, P Serp, R Feurer, Y Kihn, C Vahlas, P Kalck: Parametric study for the growth of carbon nanotubes by catalytic chemical vapor deposition in a fluidized bed reactor. Carbon 40 (2002) 1799-807.
Diener, M. D., et al., "Synthesis of single walled carbon nanotubes in flames," J. of Phys. Chem. B, ACS, vol. 104, No. 41, pp. 9615-9620, Oct. 19, 2000, XP002289403.
Ergut, A. et al., "Chemical speciation of premixed ethylbenzene flames at the soot onset limit at various ($\phi$, T) pairs," Combustion and Flame 156 (2009) 1014-1022.

ET Thostenson, Z Ren, T-W Chou: Advances in the science and technology of carbon nanotubes and their composites: a review. Composites Science & Technology 61 (2001) 1899-912.
F Lamari Darkrim, P Malbrunot, GP Tartaglia: Review of hydrogen storage by adsorption in carbon nanotubes. International Journal of Hydrogen Energy 27 (2002) 193-202.
GG Tibbetts, GP Meisner, CH Olk: Hydrogen storage capacity of carbon nanotubes, filaments, and vapor-grown fibers. Carbon 39 (2001) 2291-301.
GG Tibbetts, MG Devour, EJ Rodda: An adsorption-diffusion isotherm and its application to the growth of carbon filaments on iron catalyst particles. Carbon 25 (1987) 367-75.
Grieco, W.J. et al., "Fullerenes and Pah in Low-Pressure Premixed Benzene/Oxygen Flames," Twenty-Seventh Symposium (International) on Combustion/The Combustion Institute, 1998/pp. 1669-1675.
H Dai: Carbon nanotubes: opportunities and challenges. Surface Science 500 (2002) 218-41.
H Richter, K Hernadi, R Caudano, A Fonseca, H-N Migeon, JB Nagy, S Schneider, J Vandooren, PJ Van Tiggelen: Formation of nanotubes in low-pressure hydrocarbon flames. Carbon 34 (1996) 427-29.
H Zhu, C Xu, B Wei, D Wu: A new method for synthesizing double-walled carbon nanotubes. Carbon 40 (2002) 2021-40.
H-B Chen, J-D Lin, Y Cai, X-Y Wang, J Yi, J Wang, G Wei, Y-Z Lin, D-W Liao: Novel multi-walled nanotubes-supported and alkali-promoted Ru catalysts for ammonia synthesis under atmospheric pressure. Applied Surface Science 180 (2001) 328-35. cited byother.
Haynes, B.S. et al., "Soot Formation," Prog. Energy Combust. Sci., vol. 7, pp. 229-273, 1981.
HC Choi, M Shim, S Bangsaruntip, H Dai: Spontaneous reduction of metal ions on the sidewalls of carbon nanotubes. Journal of the American Chemical Society 124 (2002) 9058-59.
Height, Murray J., et al., "Flame Synthesis of Carbon Nanotubes" Materials Research Society Symposium—Proceedings 2003, Nanotube-Baseddevices Symposium, San Francisco, CA, 22-25, vol. 772, 2003 pp. 55-61, Apr. 2003, XP008032429.
HM Cheng, F Li, G Su, HY Pan, LL He, X Sun, MS Dresselhaus: Large-scale and low-cost synthesis of single-walled carbon nanotubes by the catalytic pyrolysis of hydrocarbons. Applied Physics Letters 72 (1998) 3282-84.
HM Duan, JT McKinnon: Nanoclusters produced in flames. Journal of Physical Chemistry 98 (1994) 12815-18.
Hornyak, G.L. et al., "A Temperature Window for Chemical Vapor Decomposition Growth of Single-Wall Carbon Nanotubes," J. Phys. Chem. B. 2002, 2821-2825.
HW Zhu, CL Xu, DH Wu, BQ Wei, R Vajtai, PM Ajayan: Direct synthesis of long single-walled carbon nanotube strands. Science 296 (2002) 884-86.
International Preliminary Report on Patentability dated Sep. 16, 2005, for PCT/US2004/005891, filed Feb. 27, 2004.
International Search Report and Written Opinion dated Mar. 8, 2004, for PCT/US2004/005891, filed Feb. 27, 2004.
J Bernholc, C Roland, Bi Yakobson: Nanotubes. Current opinion in solid state & materials science 2 (1997) 706-15.
JB Howard, KD Chowdhury, JB VanderSande: Carbon shells in flames. Nature 370 (1994) 603.
JLC Papadopoulos, JM Xu, M Moskovits: Highly-ordered carbon nanotube arrays for electronics applications. Applied Physics Letters 75 (1999) 367-69.
JM Singer, J Grumer: Carbon formation in very rich hydrocarbon-air flames. I. Studies of chemical content, temperature, ionization and particulate matter. Seventh Symposium (International) on Combustion (1959) 681-91.
JT McKinnon: Chemical and physical mechanisms of soot formation, PhD Thesis, Massachusetts Institute of Technology, Cambridge, MA, 1989.
K Das Chowdhury, JB Howard, JB VanderSande: Fullerenic Nanostructures in Flames. Journal of Materials Research 11 (1996) 341-47.
K Jurewicz, S Delpeux, V Bertagna, F Beguin, E Frackowiak: Supercapacitors from nanotubes/polypyrrole composites. Chemical Physics Letters 347 (2001) 36-40.

K Saito, AS Gordon, FA Williams, WF Stickle: A study of the early history of soot formation in various hydrocarbon diffusion flames. Combustion Science and Technology 80 (1991) 103-19.

L Yuan, K Saito, C Pan, FA Williams, AS Gordon: Carbon nanotubes from methane flames. Chemical Physics Letters 340 (2001) 237-41.

L Yuan, K Saito, W Hu, Z Chen: Ethylene flame synthesis of well-aligned multi-walled carbon nanotubes. Chemical Physics Letters 346 (2001) 23-28.

M Shim, N Wong Shi Kam, RJ Chen, Y Li, H Dai: Functionalization of carbon nanotubes for biocompatibility and biomolecular recognition. Nano Letters 2 (2002) 285-88.

MD Diener, N Nichelson, JM Alford: Synthesis of single-walled carbon nanotubes in flames. Journal of Physical Chemistry B 104 (2000) 9615-20.

MD Rumminger, GT Linteris: Inhibition of premixed carbon monoxide-hydrogen-oxygen-nitrogen flames by iron pentacarbonyl. Combustion and Flame 120 (2000) 451-64.

MD Rumminger, GT Linteris: The role of particles in the inhibition of premixed flames by iron pentacarbonyl. Combustion and Flame 123 (2000) 82-94.

Millikan, R.C. "Non-Equilibrium Soot Formation in Premixed Flames," vol. 66, pp. 794-799, May 1962.

MS Dresselhaus, G Dresselhaus, A Jorio, AG Souza Filho, R Saito: Raman spectroscopy on isolated single wall carbon nanotubes. Carbon 40 (2002) 2043-61.

MS Dresselhaus, G Dresselhaus, PC Eklund: Science of fullerenes and carbon nanotubes, Academic Press, New York, 1995.

MS Dresselhaus, PC Eklund: Phonons in carbon nanotubes. Advances in Physics 49 (2000) 705-.

MS Dresselhaus: Down the straight and narrow. Nature 358 (1992) 195-96.

N Wang, ZK Tang, GD Li, JS Chen: Single-walled 4.ANG. carbon nanotube arrays. Nature 408 (2000) 50-51.

OK Varghese, PD Kichambre, D Gong, KG Ong, EC Dickey, CA Grimes: Gas sensing characteristics of multi-wall carbon nanotubes. Sensors and Actuators B 81 (2001) 32-41.

Olson, D.B. et al., "The Effect of Temperature on Soot Formation in Premixed Flames," Combustion and Flame 60: 203-213 (1985).

OP Matyshevska, Ay Karlash, YV Shtogun, A Benilov, Y Kirgizov, KO Gorchinskyy, EV Buzaneva, YI Prylutskyy: Self-organizing DNA/carbon nanotube molecular films. Materials Science and Engineering C 15 (2001) 249-52.

P Avouris: Carbon nanotube electronics. Chemical Physics 281 (2002) 429-45.

Q Zhao, MD Frogley, HD Wagner: Direction-sensitive strain-mapping with carbon nanotube sensors. Composites Science & Technology 62 (2002) 147-50.

Q-H Yang, P-X Hou, S Bai, M-Z Wang, HM Cheng: Adsorption and capillarity of nitrogen in aggregated multi-walled carbon nanotubes. Chemical Physics Letters 345 (2001) 18-24.

R Andrews, D Jacques, AM Rao, F Derbyshire, D Qian, X Fan, EC Dickey, J Chen: Continuous production of aligned carbon nanotubes: A step closer to commercial realization. Chemical Physics Letters 303 (1999) 467-74.

RH Baughman, CX Cui, AA Zakhidov, Z Iqbal, JN Barisci, GM Spinks, GG Wallace, A Mazzoldi, D De Rossi, AG Rinzler, O Jaschinski, S Roth, M Kertesz: Carbon nanotube actuators. Science 284 (1999) 1340-44.

RL Vander Wal, GM Berger, LJ Hall: Single-walled carbon nanotube synthesis via a multi-stage flame configuration. Journal of Physical Chemistry B 106 (2002) 3564-67.

RL Vander Wal, LJ Hall, GM Berger, The chemistry of premixed flame synthesis of carbon nanotubes using supported catalysts, Twenty-Ninth Symposium (International) on Combustion, 2002.

RL Vander Wal, LJ Hall, GM Berger: Optimization of flame synthesis for carbon nanotubes using supported catalyst. Journal of Physical Chemistry B 106 (2002) 13122-32.

RL Vander Wal, TM Ticich, VE Curtis: Diffusion flame synthesis of single-wall carbon nanotubes. Chemical Physics Letters 323 (2000) 217-23.

RL Vander Wal, TM Ticich: Comparative flame and furnace synthesis of single-walled carbon nanotubes. Chemical Physics Letters 336 (2001) 24-32.

RL Vander Wal, TM Ticich: Flame and furnace synthesis of single-walled and multi-walled carbon nanotubes. Journal of Physical Chemistry B 105 (2001) 10249-56.

RL Vander Wal: Fe-catalyzed single-walled carbon nanotube synthesis within a flame environment. Combustion and Flame 130 (2002) 37-47.

RL Vander Wal: Ferrocene as a precursor reagent for metal-catalyzed carbon nanotubes: competing effects. Combustion and Flame 130 (2002) 27-36.

RL Vander Wal: Flame synthesis of Ni-catalyzed nanofibers. Carbon 40 (2002) 2101-07.

RQ Long, RT Yang: Carbon nanotubes as superior sorbent for dioxin removal. Journal of the American Chemical Society 123 (2001) 2058-59.

RTK Baker, DJC Yates, JA Dumesic, in L.F. Albright, R.T.K. Baker (Eds.), Filamentous carbon formation over iron surfaces. American Chemical Society, Washington, DC, 1982, p. 1-21.

Rumminger, M. D., et al., "The role of particles in the inhibition of premixed flames by iron pentacarbonyl<2>," Combustion and Flame, Elsevier Science Publishing Co, New York, NY, vol. 23, No. 1-2, pp. 82-94, Oct. 2000, XP004279273. cited byother.

S Iijima: Helical microtubules of graphitic carbon. Nature 354 (1991) 56-58.

SB Sinnott, R Andrews, D Qian, AM Rao, Z Mao, EC Dickey, F Derbyshire: Model of carbon nanotube growth through chemical vapor deposition. Chemical Physics Letters 315 (1999) 25-30.

T Gennett, AC Dillon, JL Alleman, KM Jones, FS Hassoon, MJ Heben: Formation of single-wall carbon nanotube superbundles. Chemistry of Materials 12 (2000) 599-601.

TW Ebbesen, PM Ajayan: Large-scale synthesis of carbon nanotubes. Nature 358 (1992) 220-22.

Vander Wal R. L., "Fe-catalyzed single-walled carbon nanotube synthesis within a flame environment," Combustion and Flame, Elsevier Science Publishing Co., New York, NY, vol. 130, No. 1-2, pp. 37-47, Jul. 2002, XP004370087.

W Li, C Liang, J Qiu, W Zhou, H Han, Z Wei, G Sun, Q Xin: Carbon nanotubes as support for cathode catalyst of a direct methanol fuel cell. Carbon 40 (2002) 787-803.

W Merchan-Merchan, A Saveliev, LA Kennedy, A Fridman: Formation of carbon nanotubes in counter-flow, oxy-methane diffusion flames without catalysts. Chemical Physics Letters 354 (2002) 20-24.

WJ Grieco: Fullerenes and carbon nanostructures formation in flames, Doctoral thesis, Massachusetts Institute of Technology, Cambridge, 1999.

Y Wang, F Wei, G Gu, H Yu: Agglomerated carbon nanotubes and its mass production in fluidized-bed reactor. Physica B 323 (2002) 327-29.

Y-H Li, S Wang, J Wei, X Zhang, C Xu, Z Luan, D Wu, B Wei: Lead adsorption on carbon nanotubes. Chemical Physics Letters 357 (2002) 263-66.

ZW Pan, SS Xie, BH Chang, LF Sun, WY Zhou, G Wang: Direct growth of aligned open carbon nanotubes by chemical vapor deposition. Chemical Physics Letters 299 (1999) 97-102.

Merchan-Merchan W, et al., Combustion synthesis of carbon nanotubes and related nanostructures, Progress in Energy and Combustion Science (2010), doi: 10.1016/j.pecs/2010.02.005.

Height, M.J. et al., "Flame synthesis of single-walled carbon nanotubes," Carbon 42 (2004) 2295-2307.

Nikolaev, P. et al., "Gas-phase catalytic growth of single-walled carbon nanotubes from carbon monoxide," Chemical Physics Letters 313 (1999) 91-97.

Salooja, Ph.D., K.C. "Burner fuel additives," Journal of the Institute of Fuel, Jan. 1972, pp. 37-42.

Tian, K. et al., "Influence of ferrocene addition to a laminar premixed propene flame: Laser diagnostics, mass spectrometry and numerical simulations," Proceedings of the Combustion Institute 32 (2009) 445-452.

Bartholome, E. et al., "Katalytische Erscheinungen an Aerosolen," Presented by E. Bartholome at the discussion conference of the Bunsen Society at Gottingen on Apr. 23, 1949, pp. 326-331 (with English translation).

* cited by examiner

FIG. 1
PRIOR ART
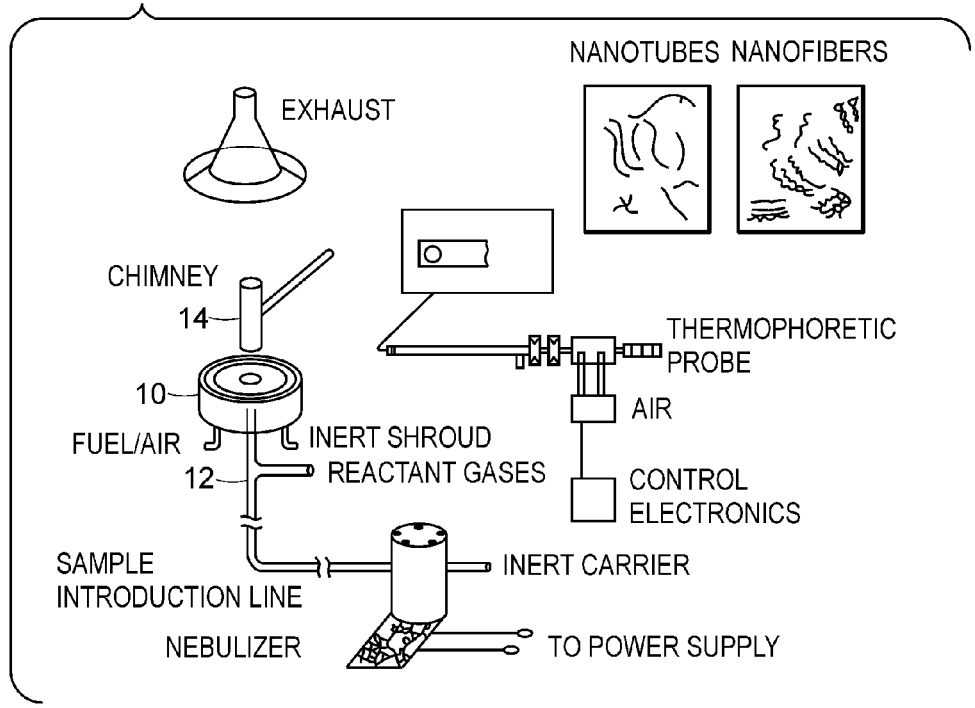
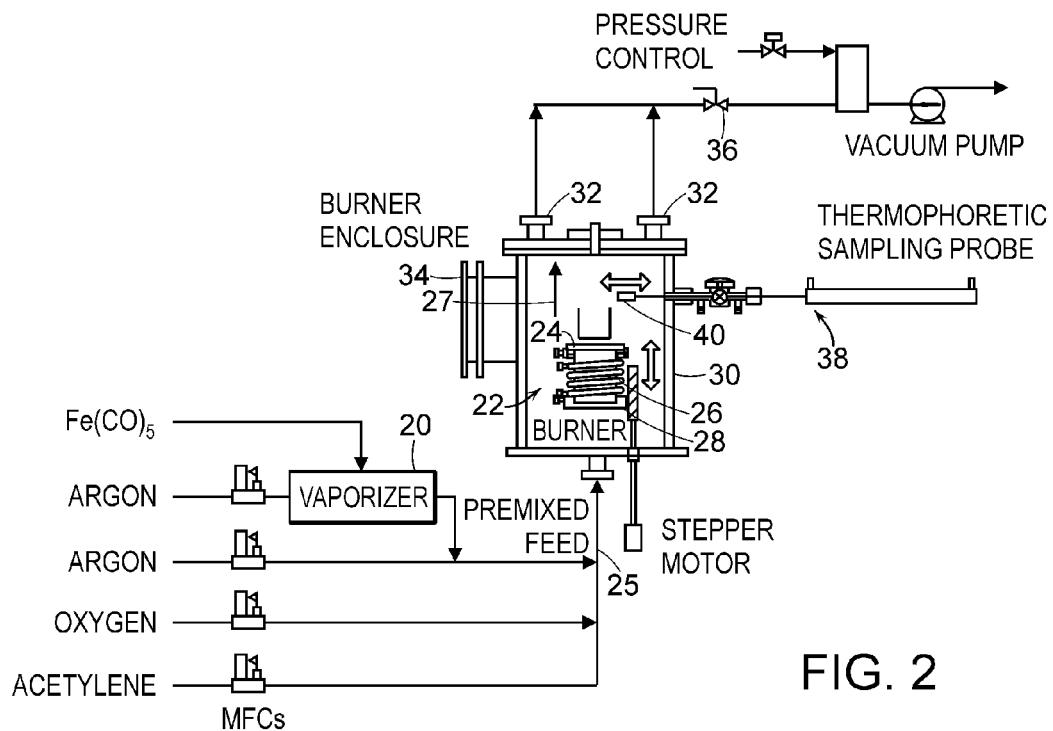
FIG. 2

METHOD AND APPARATUS FOR SYNTHESIZING FILAMENTARY STRUCTURES

The present application is a continuation of and claims priority to U.S. application Ser. No. 10/389,002, filed Mar. 14, 2003; now U.S. Pat. No. 7,335,344 the entire contents of the above-referenced application is incorporated herein by reference.

BACKGROUND OF THE INVENTION

This invention relates to method and apparatus for synthesizing filamentary structures including nanotubes in the post-flame region of a non-sooting premixed or non-premixed flame using unsupported catalysts.

Since their discovery in 1991 (1), carbon nanotubes have sparked a surge of interest (2-5). Numbers in parentheses refer to the reference list included herein. The teachings in all of these references are incorporated by reference herein. The many unique properties of nanotubes gives appeal to a wide range of potential applications in areas such as mechanical actuators (6, 7), sensors (8-10), polymer composites (11), electronics (12-16), biosensors and biocompatibility (17, 18), gas storage (19-22), adsorption (23-25), and catalysis (26-28). Techniques that have been demonstrated to synthesize carbon nanotubes include laser ablation (29, 30), plasma arc (31), chemical vapor deposition (CVD) (32-34), fluidized bed reactors (35, 36), and combustion systems (37-51).

Flames offer potential as means of producing bulk quantities of carbon nanotubes in a continuous, economically favorable process. There are three key requirements for nanotube synthesis common to most of the synthesis techniques: 1) a source of carbon, 2) a source of heat, and 3) presence of metallic catalyst particles. A fuel-rich flame is a high-temperature, carbon-rich environment that can be suitable for nanotube formation if certain metals are introduced into the system.

There have been a number of reported observations in the combustion literature of nanotubes and filamental carbon structures within flame systems. Perhaps the earliest observation of intriguing tube-like structures in flames is reported by Singer (52) in the 1950s and within the last decade there have been occasional reports of nanotube structures (38, 49, 50, 53-57). These observations are typically reported as curiosities and are largely serendipitous in nature. In recent years Diener et al. (51), Saito et al. (49, 50), and Vander Wal et al (37-45) have independently made more detailed studies of nanotube formation in flames.

Diener et al. (51) report the synthesis of single-walled carbon nanotubes in sooting flames. A semi-premixed flame configuration is used with fuel gases (acetylene, ethylene or benzene) issued through numerous small diameter tubes distributed through a sintered metal plate through which oxygen flows, drafting past the fuel tubes. Iron and nickel bis(cyclopentadiene) compounds are vaporized and issued to the flame feed as a metal catalyst precursor. Single-walled carbon nanotubes are observed in acetylene and ethylene flames (within the equivalence ratio range of 1.7 to 3.8) while multi-walled nanotubes are observed in benzene flames (within the equivalence ratio range of 1.7 to 3.4). An equivalence ratio, $\phi$, is defined as the actual fuel/oxygen ratio divided by the stoichiometric fuel/oxygen ratio corresponding to conversion of all carbon to $CO_2$ and all hydrogen to $H_2O$. Diener et al. do not report the level of dilution with argon, the concentration of metal species added to the flame, or the inlet velocity for the feed gas mixture—all are parameters affecting nanotube formation in flames. The reported overall single-walled carbon nanotube yields are very low "certainly less than 1% of the carbon soot product" and this small population of single-walled walled carbon nanotubes is confirmed by inspection of the transmission electron microscope (TEM) micrographs in the article. The nanotube bearing soot material analyzed by Diener et al. is collected from a filter system far downstream from the burner and there is no information relating to the time, temperature or concentration history of the material, making it difficult to judge the extent to which nanotubes were in fact formed in the flame and how much growth occurred during extended exposure to flame exhaust while collecting in associated downstream systems. Prior to analysis, the material is prepared using a separation technique employing sonication of the soot in methanol to disperse the sample—it is unclear how this preparation technique might alter the composition of the material and if the material is representative of solid material present in the flame itself. Diener et al. place emphasis on the use of sooting flames for the synthesis of their materials which is in fact analogous to the approach reported by Howard et al. (46-48), Richter et al. (55), and Duan et al. (54). The reported range of equivalence ratios is stated as 1.7 to 3.8 which is very much focused on exploiting sooting conditions. Furthermore, the quantities of nanotubes observed in the condensed material is very small (<1%).

Saito et al. (49, 50) immersed metallic substrates in various hydrocarbon fueled diffusion flames and observed multi-walled carbon nanotubes that had formed on the substrate. It will be understood by those familiar with the combustion literature that a diffusion flame is one type of non-premixed flame. Vander Wal and coauthors have observed single walled nanotubes in a hydrocarbon (acetylene or ethylene)/air diffusion flame with nitrogen diluent and metallocene catalyst precursor compound added to the fuel stream (38).

Vander Wal and coworkers make extensive use of an annular burner configuration consisting of a 50 mm diameter sintered metal plate with a central tube of 11 mm diameter that is mounted flush with the surface of the burner plate. See FIG. 1. For most experiments Vander Wal et al. established a fuel rich premixed flame supported on the outer annular section of a burner plate 10 while reactant gas mixtures, including metal catalyst species of interest were fed through a central tube 12. This configuration is termed a 'pyrolysis flame' in the papers as the central gas flow does not undergo combustion due to the lack of oxygen in this flow, but reactions (and nanotube formation) do proceed in the flow by virtue of the heating influence of the surrounding annular flame. The central gas flow is in effect a reactive streamtube and not a flame. A stabilizing chimney 14 (7.5×2.5 cm diameter) immersed in the flame gases provides a stabilizing effect and nanotube (single-wall, multi-wall nanotubes and nanofiber) samples are collected at the exit of the chimney. There are some important distinctions to note regarding this configuration. First of all, the outer (annular) flame is primarily a source of heat and the central gas mixture flow is the primary source of carbon and metallic catalyst. Combustion is not supported in the central gas flow. Therefore, heating and material synthesis processes are substantially separated functions.

A flame system has been used extensively in combination with a wide variety of methods to introduce metallic catalyst species to the system. Vander Wal and Ticich performed comparative experiments, synthesizing nanotubes in both the 'pyrolysis flame' and tube reactor setups (39, 40). The premixed flame in the outer annulus used acetylene/air mixtures of equivalence ratios between 1.4 and 1.62. The reactant gas mixtures used in this instance used either carbon monoxide/ hydrogen or acetylene/hydrogen mixtures, and iron or nickel nanoparticles entrained in the central feed gases. In a similar study, Vander Wal and Ticich used a carbon monoxide/hydrogen reactant feed mixture and used a nebulized solution of iron colloid (ferrofluid) and a spray drying technique as the source of catalyst particles. Nanotube samples were collected once again at the exit of the chimney section (39). Single-walled nanotubes were observed in a similar flame setup where Vander Wal and Hall introduced metallocene (ferrocene and nickelocene) vapor to the central reactive feed gases using a controlled sublimation technique (45). Vander Wal observed single-walled nanotubes in an identical flame arrangement using a nebulizer system to introduce iron nitrate salt solution to the flame as the catalyst particle precursor (37). Vander Wal also reports the formation of nanofibers (similar to multi-walled nanotubes except the walls tend to be irregular and non-graphitic) in an identical flame configuration with nickel nitrate solution nebulized into the flame (44).

Another variation of the catalyst feed technique with this burner configuration is reported by Vander Wal, where catalyst particles are generated by burning a piece of paper coated in metal particles and the resulting aerosol is entrained in a fuel-rich mixture of carbon monoxide, hydrogen and air. The resulting gas mixture is fed to the central section of an annular fuel-rich acetylene-air flame and single-walled nanotubes are collected at the exit of a cylindrical chimney surrounding the central streamtube. In this instance the central gas flow does in fact lead to a premixed flame (as opposed to a pyrolysis reaction streamtube in previous experiments) where the premixed flame composition is carbon monoxide, hydrogen and air with entrained iron nano-particles. Single-wall nanotubes were once again collected at the exhaust of the stabilizing chimney (43). In this configuration, the premixed gas feed did not contain a hydrocarbon (carbon monoxide and hydrogen are used in this case). Further, the nanotube material is collected quite late in the system at a point exclusively at the exhaust of a physical chimney insert.

Vander Wal, Hall, and Berger have synthesized multi-walled nanotubes and nanofibers on cobalt nanoparticles supported on a metal substrate immersed in premixed flames of various hydrocarbon fuels and equivalence ratios (41, 42). This configuration is truly a premixed flame and all three functions necessary for nanotube synthesis (heat source, carbon source, and metal catalyst) are present in the same flame environment. However, in this instance the catalyst particles are supported on an externally affixed substrate immersed in the flame gases.

An extensive amount of research related to the formation of fullerenes and fullerenic nanostructures in flames has been reported in the last decade (46-48, 56, 58, 59). In particular, there have been two studies by Howard et al. where carbon nanotubes have been observed in condensed material collected from flames (47, 48). Howard et al. employed a premixed flame configuration operated at low pressure (20 to 97 Torr), and burner gas velocity between 25 and 50 cm/s. A variety of fuels and fuel/oxygen compositions (C/O ratios) were explored including acetylene (C/O 1.06, $\phi$=2.65), benzene (C/O 0.86 to 1.00, $\phi$=2.15 to 2.65) and ethylene (C/O 1.07, $\phi$=3.21). Diluent concentrations between 0 and 44 mol % were also explored. These flames are all considered 'sooting' flames as they spontaneously generate condensed carbon in the form of soot agglomerates suspended in the flame gases. Similarly, other studies that have reported nanotubes in flames such as Duan et al. (54) and Richter et al. (55) have each been under sooting conditions. Samples of condensed material were obtained directly from the flame using a water-cooled gas extraction probe (between 2 to 7 cm above burner), and also from the water-cooled surfaces of the burner chamber. Nanostructures were extracted from the collected soot material by sonication of soot material dispersed in toluene. High resolution electron microscopy of the extracted material allowed visual analysis of the fullerenic nanostructures. A range of nanostructures was observed, including spherical, spheroidal, tubular and trigonous structures, typically composed of multiple, graphitic carbon planes. Nanotubes are observed in these materials and tend to be multi-walled nanotubes typically with more than 5 walls. The nanotube material is generally observed predominantly in the material collected from the chamber surfaces. U.S. Pat. No. 5,985,232 has been awarded for 'production of fullerenic nanostructures' that draws heavily on the methods and observations reported in the papers described above (46). The patent discloses a method based on a flame burning unsaturated hydrocarbons, operated at sub-atmospheric pressure (up to 300 Torr), with diluent present in the flame feed gases, and also makes allowance for the addition of metal species (such as iron, cobalt, nickel, calcium, magnesium, potassium, rubidium and strontium) to promote the formation of single-walled nanostructures. Additional disclosure relates to the potential of adding oxidant species to the flame gases to selectively purify the nanostructures relative to the soot material and possibly open the end-caps of nanotube materials.

There have been a number of combustion studies that have employed some components of the system described in the present patent application, yet did not observe the formation of carbon nanotube material. Rumminger et al. (60, 61) introduced a vapor of iron pentacarbonyl into premixed flames of methane/air and also carbon monoxide/hydrogen/air. The focus of the studies was on flame inhibition due to the compound. No nanotube material is reported from this work and the likely reason is the low equivalence ratio employed in these studies. Feitelberg and coworkers also injected metal compounds into premixed flames in order to examine the effect upon soot formation in fuel rich flames. Nanotube-like material was not reported from these studies, most likely because the equivalence ratios employed were too high. Janzen and Roth (62) examined the formation of iron-oxide particles in a premixed hydrogen/oxygen/argon flame injected with iron pentacarbonyl and did not observe any nanotube formation. The reason is very simply that there was insufficient carbon in this flame system. Each of these flame studies employed some, but not all, of the components that have been found to favor nanotube formation in a premixed flame.

SUMMARY OF THE INVENTION

In one aspect, the invention is a method for producing filamentary structures such as nanotubes including combusting hydrocarbon fuel and oxygen so as to establish a non-sooting pre-mixed or non-premixed flame and providing an unsupported catalyst to synthesize the filamentary structure in a post-flame region of the flame. The equivalence ratio, catalyst type and catalyst concentration may be selected to establish the non-sooting flame. In a preferred embodiment, residence time of the structures in the post-flame region of the flame extends up to approximately 200 milliseconds. It is preferred that a diluent such as argon be provided along with the hydrocarbon fuel and oxygen. It is also preferred that the catalyst be a metal in the form of an aerosol produced in the flame either by chemical reactions of a precursor compound such as iron pentacarbonyl and coagulation of the reaction products or by physical dispersion and mixing of pre-prepared catalyst particles.

In preferred embodiments, the filamentary structures are nanotubes each having a small diameter with either a metallic or semiconductor chirality. The invention further contemplates adding modifying agents such as ammonia, thiophene, hydrogen and carbon monoxide. A secondary oxidant may also be injected into the post-flame region so as to preferentially oxidize carbon or metallic contamination, or open filament structure.

In yet another embodiment, an electric and/or magnetic field may be impressed upon the flame or the post-flame region of the flame to alter residence time profiles and/or particle trajectories to alter filamentary structure and/or morphology. In one embodiment, an electric field having a selected strength is impressed upon the flame wherein the field lines are substantially parallel to the flame gas flow to induce preferential growth of the structures having either metallic or semiconductor chirality.

In yet another embodiment, an electric and/or magnetic field may be impressed upon the flame or the post-flame region of the flame to alter residence time profiles and/or particle trajectories to induce a separation effect. In one embodiment, an electric field having a selected strength is impressed upon the flame wherein the field lines are substantially perpendicular to flame gas flow to induce preferential separation of the structures from the flame gases.

In yet another aspect, the invention includes an apparatus for synthesizing filamentary structures having a burner system and a source of hydrocarbon fuel and oxygen delivered to the burner system to establish a non-sooting premixed or non-premixed flame A source of unsupported catalyst is provided to deliver the unsupported catalyst into the burner system. In a preferred embodiment, the burner system is designed to provide a selected residence time in a post-flame region in the burner system.

BRIEF DESCRIPTION OF THE DRAWING

FIG. 1 is a perspective, schematic view of a prior art experimental annular burner configuration.

FIG. 2 is a schematic illustration of the apparatus of the present invention.

DESCRIPTION OF THE PREFERRED EMBODIMENT

Definitions

Figure 3:
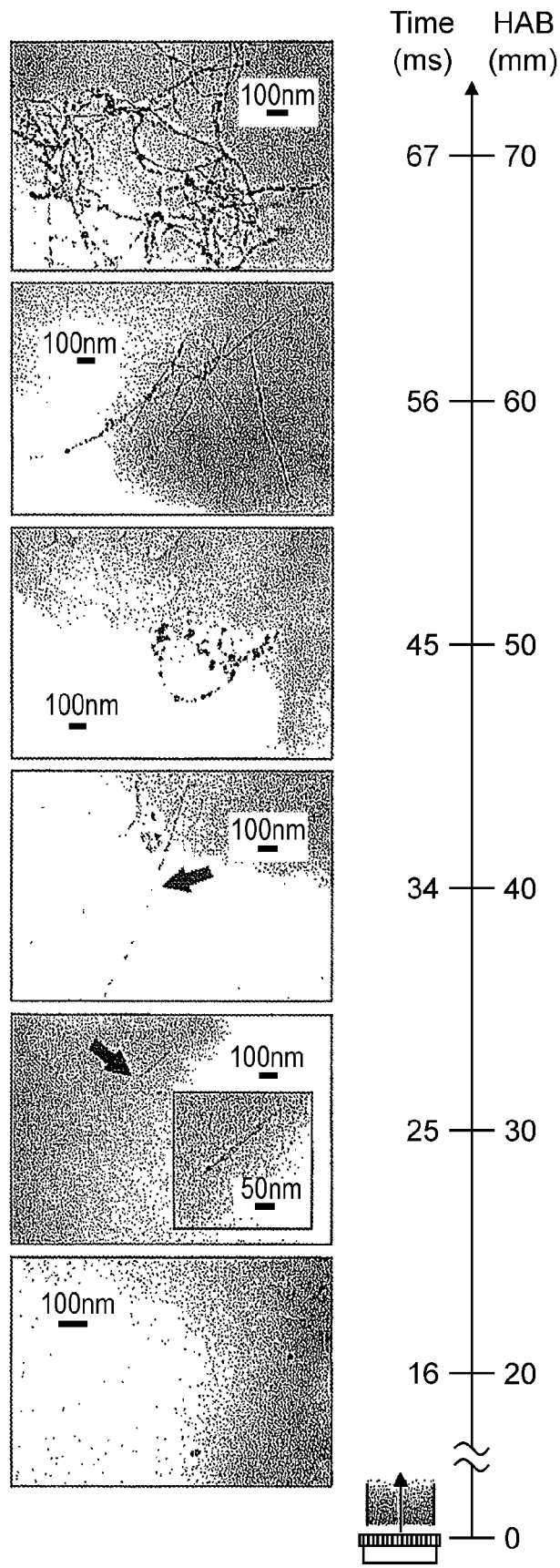
FIG. 3 is a series of transmission electron microscope (TEM) images showing a progression of nanotube morphologies with increasing height above the burner (corresponding to increasing residence time).

The term 'catalyst' refers to particles introduced to the flame gases to initiate filamentary structure growth and control the nature of the formed structures.

The term 'unsupported catalyst' refers to catalyst particles (or precursor reagents that decompose to form components that coalesce and consequently form catalyst particles) that are introduced to the flame environment independent of any physical support affixed to a point or surface outside of the post-flame domain.

The term 'filamentary structures' refers to materials where there exists a dominant linear dimension, giving the structure of the material a filament-like or filamentary appearance. See also the definition of aspect ratio below.

The term 'filamentary nanostructures' refers to filamentary structures that have one or more dimensions on the scale of nanometers. Filamentary nanostructures include nanotubes, nanowires, nanocones, peapods, and nanofibers.

The term 'fullerenic' refers most specifically to an allotropic form of carbon that exhibits a three-dimensional curved structure comprising one or more layers or shells each including five- and sometimes seven-membered rings within a network of otherwise six-membered rings.

The term 'nanotube' implies a tubular structure of nanoscale dimensions. Nanotubes may be fullerenic in nature, implying they have end caps that close the surface of the structure, or may be tubular yet with end regions affixed to features (such as metal particles) other than curved end-caps, or the nanotubes may be open at one or multiple ends of the structure. More formally, there are essentially four categories that define the structure of nanotubes.

1. Single or multiwalled: Nanotubes can be considered as a graphitic plane rolled to form a cylinder. There are two main classes of carbon nanotubes. A single-walled nanotube (SWNT) is a single graphitic layer in the form of a tube. Multi-walled nanotubes (MWNT) consist of multiple layers arranged concentrically about a common axis. Double-walled nanotubes (DWNT) (63) are occasionally described as a distinct class, however they can be considered as the smallest category of MWNT.
2. Diameter: Single wall nanotubes have diameters of order 1 nm. Typical range of diameters spans from 0.7 nm (the diameter of $C_{60}$) through to 10 nm. The smallest observed nanotube diameter is 0.4 nm (4 Å) (64, 65). The diameter of multi-walled nanotubes varies between around 1 nm up to 100 nm.
3. Aspect ratio: One of the most striking properties of nanotubes is the disparity in their dimensions. The length of nanotubes can extend to order of microns and more, giving an aspect ratio (length to diameter) of 1000 to 1. The longest nanotubes reported to date (66) are 20 cm, giving an aspect ratio of 200,000,000 to 1! As used herein, filamentary structures have an aspect ratio of at least 10 to 1.
4. Chirality: The chirality of a nanotube refers to the 'twist' in the graphitic layer that makes up the tube wall. Certain chiralities can give metallic conduction while others are semiconductive. The chirality of a nanotube can be described uniquely by two indices (m,n). By folding a graphene sheet into a cylinder so that the beginning and end of a (m,n) lattice vector in the graphene plane join together, one obtains an (m,n) nanotube (4). (m,m) nanotubes are said to be 'arm-chair', (m,0) and (0,m) nanotubes are 'zig-zag', and (m,n) nanotubes are chiral. All arm-chair nanotubes are metallic but only one third of possible zig-zag and chiral nanotubes are metallic, the other two thirds being semiconducting (67).

The term 'nanowire' implies a linearly contiguous and non-hollow length of metal based material with diameter on a scale of nanometers. Nanowires can be formed by filling the internal cavity of carbon nanotubes with metals and other elements.

The term 'nanocone' refers to a class of materials that have a dominant linear dimension with a non-constant diameter increasing or decreasing relative to the position along the length of the structure.

The term 'peapod' refers to carbon nanotubes that have one or more carbon fullerenes occupying the internal cavity of the nanotube.

The term 'nanofiber' refers to filamental structures that are similar in structure to multi-walled nanotubes as they possess multiple structural layers in the wall area. Nanofibers are much more disordered and irregular relative to nanotubes and the walls are non-graphitic. Carbon nanofibers may alternately be described as carbon fibrils, vapor grown carbon fibers (VGCF), filamental carbon, filamental coke or simply filaments.

The term 'graphitic' refers most specifically to an allotropic form of carbon that exhibits a flat, two-dimensional, planar structure. The term graphitic in the context of this document refers to the flat geometric structure and the high degree of order associated with a planar structure, and does not necessarily imply an elemental composition of carbon. A graphitic plane rolled into a cylinder can therefore describe the structure of a single-walled nanotube.

The term 'post-flame region or zone' is the part of the flame located downstream of, or farther from a burner than, the oxidation region or zone of the flame. The beginning of the post-flame region is marked by the approximate completion of the consumption of molecular oxygen and the conversion of the original fuel to intermediates and products including carbon monoxide, carbon dioxide, acetylene, other carbon containing species, hydrogen and water. The post-flame region includes the tail of the flame, extends to the transition between the flame and the exhaust, and consists of hot but usually cooling gases which are approximately well mixed within a given cross section of the flow perpendicular to the direction of flow at a given distance from the burner. The well-mixed condition is achieved by mixing the fuel and oxygen together before feeding them to the burner (premixed combustion) or by feeding the fuel and oxygen as separate streams which rapidly mix within the combustor over a downstream distance from the burner that is much smaller than the diameter or the equivalent diameter of the post flame region (non-premixed combustion). The residence time in the post-flame region is much larger than the residence time in the oxidation region of premixed flames or the mixing and oxidation region of non-premixed flames.

The term 'sooting flame' refers to a flame system including a fuel and oxygen undergoing combustion in such a way that carbon soot is generated in visibly significant quantities. Almost all non-premixed flames of hydrocarbon fuels exhibit soot formation. The sooting limit for premixed flames is defined as the lowest equivalence ratio (or carbon to oxygen ratio) at which soot is observed in the flame gases. A sooting flame has a distinctive, visibly luminous glow caused by emission from the soot particles. A non-sooting flame is established by a fuel equivalence ratio (or carbon to oxygen ratio) lower than the sooting limit.

Addition of metal bearing compounds to the flame may induce visible luminosity yet the flame is not sooting as in this instance the sooting limit is defined for the base-flame (fuel, oxygen only). For non-sooting flames the radiance is caused by emission from the metal particles rather than soot particles.

In flames containing nanotube formation catalysts, the critical equivalence ratio for soot formation depends not only on equivalence ratio, but also on the type and concentration of catalysts present. Metal catalysts may augment soot formation such that a non-sooting condition may become sooting upon catalysts addition if the flame were at an equivalence ratio near the sooting limit and the type and concentration of catalyst added were sufficient.

Burner System

A premixed acetylene/oxygen/argon flame formed the basis of the experiments disclosed in this patent application. An argon dilution of 15 molar percent, cold gas feed velocity of 30 cm/s, and burner pressure of 50 Torr were used throughout the experiments. A variety of fuel equivalence ratios ranging from 1.4 through 2.2 were considered. Iron pentacarbonyl $(Fe(CO)_5)$ was used as the source of metallic catalyst necessary for nanotube synthesis.

With reference to FIG. 2, a controlled flow of iron pentacarbonyl vapor was supplied through a temperature-controlled (4° C.) single-stage bubble saturator 20 unit using argon as the carrying gas. The argon gas flow could be accurately proportioned between the saturator 20 and a bypass line, allowing control of the catalyst feed rate. Typical iron pentacarbonyl feed concentrations were 6000 ppm (molar).

A burner 22 consisted of a 100 mm diameter copper plate 24 with 1500 uniformly spaced 1 mm diameter holes drilled through the surface. Only the inner 70 mm diameter burner section was utilized for this study with the outer annular section used during flame startup. The burner plate 24 is attached to a burner cavity filled with stainless steel wool to facilitate uniform flow distribution of premixed gases 25 entering from the base of the cavity. Suitable premixed gases include acetylene, oxygen and argon. It is also contemplated that modifying agents for altering the structure or morphology of the condensed material may be co-injected. In addition, a secondary oxidant may be injected in the post-flame region to oxidize carbon contamination. It is also contemplated to quench the filamentary structures by injecting an inert fluid that will quench by sensible energy, latent energy or chemical reaction. A flow of cooling water passes through copper tubing 26 coiled around the outside of the burner body. Burner plate temperatures were typically 70-80° C. The burner was mounted on a vertical translation stage 28, which allows measurements to be taken at various heights-above-burner (HAB). The burner 22 and translation stage 28 are contained in a stainless-steel pressure chamber 30. An upper chamber plate is water-cooled and exhaust gases are withdrawn through two ports 32 in the upper flange. A variety of ports in the sidewall of the chamber provide access to sampling and diagnostic instruments. A large (15 cm) window 34 is provided for visual observation of the flame (68). An electronic proportioning valve 36 and PID controller coupled to the exhaust extraction system allows accurate control of the chamber pressure.

Table 1 shows operational settings and parameters to obtain good quality nanotubes.

TABLE 1

Table 1: Operational settings to obtain good quality nanotubes

| Parameter | Setting | |
| --- | --- | --- |
| Fuel | Acetylene | $C_2H_2$ |
| Oxidant | Oxygen | $O_2$ |
| Diluent | Argon | Ar |
| Metal species | Iron pentacarbonyl | $Fe(CO)_5$ |
| Equivalence ratio (φ) | 1.6 (non-sooting) | (±0.02) |
| C/O ratio | 0.65 | (±0.02) |
| Chamber pressure | 50 Torr (0.066 atm) | (±0.5) |
| Gas velocity at burner (@298 K) | 30 cm/s | (±2) |
| Metal concentration in feed | 6,000 ppm (mole) | (±1000) |
| Diluent concentration | 18 mole % | (±3) |
| Sample location | Good quality material for heights above burner (HAB) >50 mm | |
| Temperature profile | 1800 K at 10 mm | (±100) |
| | 1500 K at 80 mm | (±100) |

With reference still to FIG. 2, a preferred embodiment includes an electric field represented by the arrow 27 aligned with flame gas flow and having a selected field strength. Those skilled in the art will recognize that the electric field 27 could also be a magnetic field or the combination of an electric and magnetic field to alter the characteristics of the filamentary structures produced. For example, an electric and/or magnetic field may be used to alter residence time profiles and/or particle trajectories to alter the structure or morphology of the produced structures. The electric field 27 aligned with the flame gas flow will induce preferential growth of the structures with either metallic or semiconductor chirality.

Sampling System

A thermophoretic sampling technique (69) was used to collect condensed material in the flame gases at various HAB and the samples were then analyzed using transmission electron microscopy (TEM). A thermophoretic sampling system 38 included a pneumatic piston coupled with a timing mechanism to give precise control over immersion time within the flame. An insertion time of 250 ms was used throughout the experiments. TEM grids 40 (Ladd Research Industries, 3 mm Lacy film) were affixed to a thin metal stage attached via a 6 mm diameter rod and pressure seal feedthrough to a pneumatic plunger. After insertion into the flame gases, each TEM grid was removed and subsequently taken to the microscope for analysis. A JOEL 200CX was used for the bulk of the microscopy work to allow rapid screening and turnaround of samples to be examined. More detailed microscopy was performed on a 2010 and 2000FX for high resolution images.

Scanning Transmission Electron Microscopy (STEM)

The elemental composition of any condensed material is of particular interest in terms of the nanotube formation processes occurring in the flame. STEM combined with electron dispersive x-ray spectroscopy (EDXS) allows a high resolution transmission electron microscopy image to be correlated with an elemental map that gives insight into the distribution of specific elements (such as C, Fe, O) relative to the material structures imaged using TEM. A VG HB603 system was used for STEM analysis performed in this study.

Raman Spectroscopy

Raman spectroscopy can be used to obtain information relating to the diameter and also the chirality of single-walled carbon nanotubes (70, 71). When single-wall nanotubes are irradiated with 514.5 nm argon-ion laser light, at least two distinct resonant modes are observed in the resulting Raman spectrum. Modes around the 100 to 300 $cm^{-1}$ frequency range correspond to the 'radial breathing mode' (RBM) of nanotubes where the cylindrical nanotube vibrates in a concentric expansion and contraction. The frequency of the RBM is inversely proportional to tube diameter and so the spectrum can be used to obtain tube diameter information. The second major feature in the spectrum is the 'G-band' at around 1590 $cm^{-1}$ which corresponds to transverse vibrations along the plane of the nanotube wall. Shifts in the shape of the G-band peak can indicate the nature of the nanotube chirality (semiconducting or metallic). Raman spectroscopy on condensed samples collected from the burner chamber wall was performed using a Kaiser Hololab 5000R Raman spectrometer with Raman microprobe attachment. The spectrometer was operated at 514.5 nm at 0.85 mW power in stokes configuration.

Synthesis Dynamics Characterization

Thermophoretic samples were taken at regular height intervals above the burner 22 and images obtained using transmission electron microscopy. Each sampling height corresponds to a residence time away from the burner and so this technique enables characterization of the dynamics of the nanotube growth processes occurring in the flame. Flame characterization sampling was performed on flames with equivalence ratios (φ) between 1.4 and 2.2. For each flame, samples were obtained along the axis-line in the post-flame region between 10 and 75 mm above the burner. A typical progression of nanotube morphologies observed in a flame with equivalence ratio of 1.6 is shown in FIG. 3.

The initial post-flame region (up to 40 mm) as shown in FIG. 3 is dominated by the presence of discrete particles. Particle formation and growth leads to larger particle sizes as height above burner increases. Iron pentacarbonyl decomposes rapidly upon exposure to the flame and the particles size growth most likely occurs through coagulation of the iron resulting from this decomposition (62). The composition of the particles is most likely metallic iron as observed in flames of higher equivalence ratio (72).

Nanotube growth is generally accepted to occur through a decomposition-diffusion-precipitation mechanism whereby carbon bearing species (primarily CO) catalytically decompose on the surface of a metal particle, followed by elemental carbon dissolving into the metal lattice and diffusing to the adjacent side of the particle, where the carbon precipitates in a curved tubular graphitic structure (73-75). Based on this mechanism it is likely that catalytic decomposition and 'loading' of carbon into the particles is also occurring concurrently with particle growth in this initial post-flame region.

Carbon nanotubes are observed after an inception time of approximately 30 milliseconds. A small number of discrete nanotube segments with length of the order of 100 nm are observed as early as 25 ms and longer tube lengths up to a micron in length are observed to form in the following 10 ms. It appears that the metallic particle population has reached a critical level after 25 ms and nanotube growth proceeds rapidly after this point for the next 10 to 20 ms. The critical condition may be sufficiently large particle size, carbon content, surface properties, internal lattice structure transition (41), or point of relative concentrations for CO and $H_2$ within the flame gases (42).

For times after 40 ms the dominant mechanism appears to be coalescence of the condensed material in the flame gases. Disordered networks of nanotube bundles form tangled webs decorated with metallic and soot-like particles. The complexity and size of the webs increases significantly in the upper region of the system, between 45 and 70 ms.

From the structures observed in the post-flame gases it is clear that, once initiated, nanotube growth occurs quite rapidly. An order of magnitude estimate for the nanotube growth rate is 100 μm/s based on the images and observed increase in length of 100 nm to 1 micron over a period of 10 ms (between 25 to 35 ms).

Nanotube Formation Window

Figure 4:
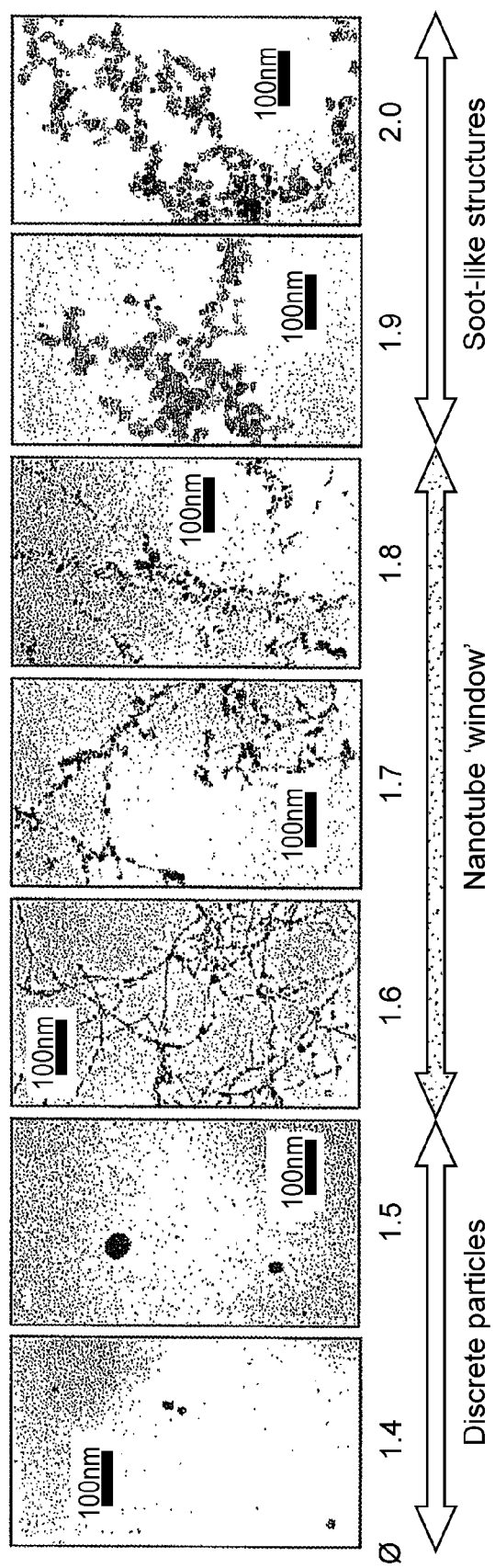
FIG. 4 includes TEM images of samples collected for various equivalence ratios.

The effect of different equivalence ratios upon nanotube formation was also investigated. Samples were extracted from 70 mm above burner (approx. 67 ms) for equivalence ratios between 1.4 and 2.0. Representative TEM images over the range of equivalence ratios are shown in FIG. 4. Nanotubes are observed to form between equivalence ratios of 1.5 and 1.9. This range of equivalence ratios can be considered as a 'formation window' where conditions within the flame are suitable for nanotube synthesis. A particularly preferred equivalence ratio range is $1.5 \leq \phi < 1.7$. For low equivalence ratios (1.4 and 1.5) the condensed material in the flame is dominated by discrete particles, although nanotubes may form at higher HAB than those described in the present system (See FIG. 11). The range of equivalence ratios that could support nanotube growth can therefore potentially extend from 1.7 to 1.0. Equivalence ratios of 1.9 and higher are dominated by soot-like structures displaying clustered networks of primary particles (of either metallic or carbon encapsulated metal centers) with the occasional nanotube within this matrix. It is interesting to note that within the formation window range, relatively 'clean' nanotubes are formed at the lower equivalence ratios while an increasing level of encrusting with disordered carbon is observed on the nanotubes as the equivalence ratio increases.

A continuum of morphologies is apparent ranging between clean nanotubes at low equivalence ratios through to an increasing proportion of soot-like material as the equivalence ratio increases. A competition between carbon precipitation pathways is likely, with one pathway leading to filamentary or tube structures and the other to disordered carbon clusters. This observation is consistent with the nanotube formation mechanism and how this would relate to a flame environment. As fuel equivalence ratio increases from unity, the level of excess carbon available in the flame gases increases, so one would also expect an increasing potential to form carbon nanotubes. This trend is tempered as the sooting equivalence ratio limit is reached and the availability of carbon exceeds the capacity of the nanotube formation pathway and disordered carbon is formed. Therefore the lower formation limit corresponds to insufficient availability of carbon, while the upper limit is due to dominance of soot formation pathways close to the sooting limit.

Figure 10:
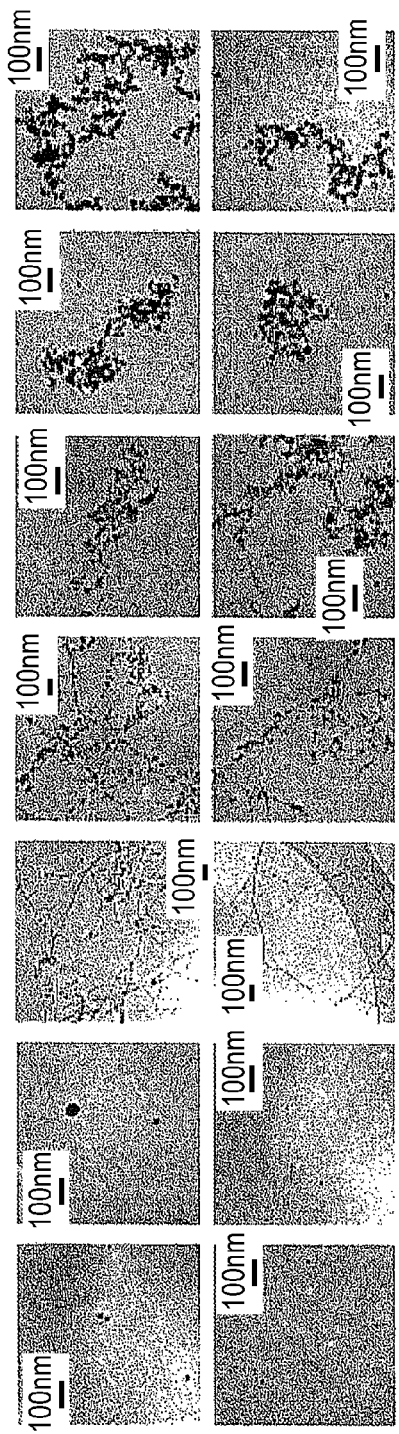
FIG. 10 is a graph, including TEM insets, showing improved nanotube quality and yield for equivalence ratios less than the sooting limit.
Figure 10:
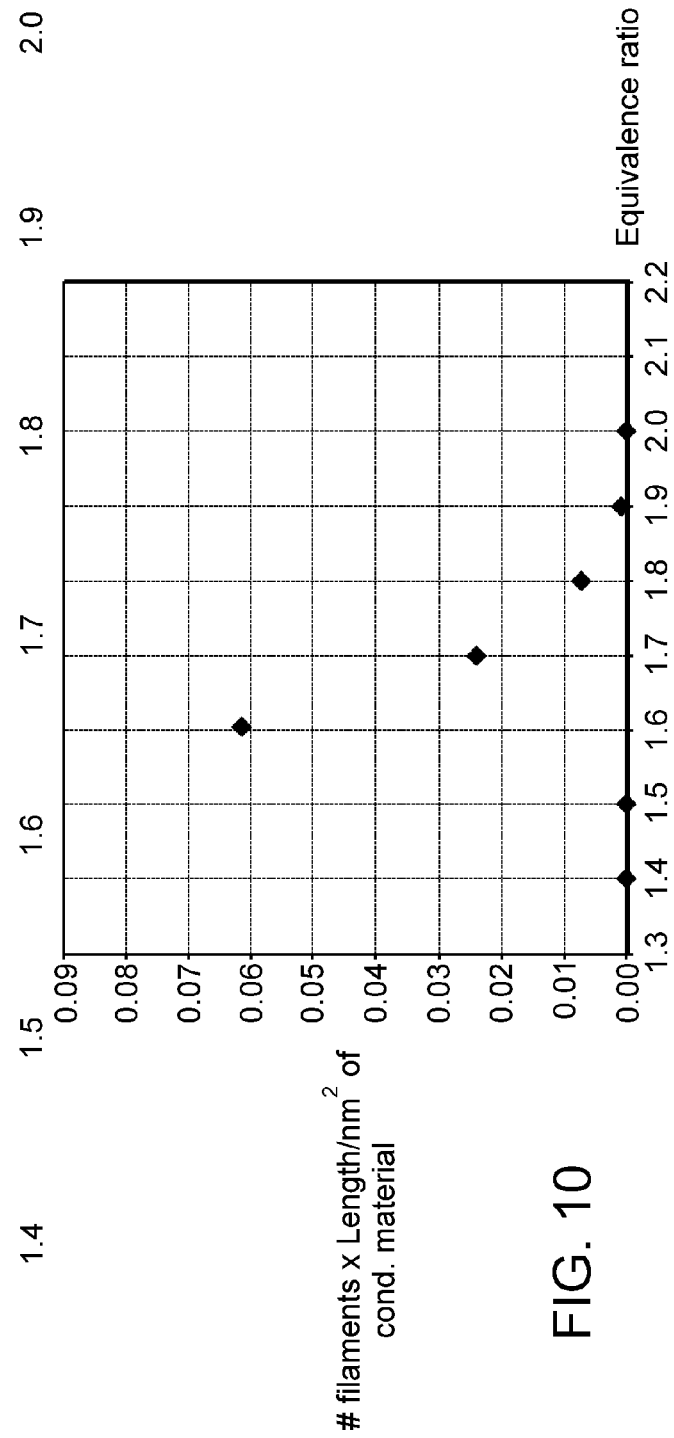

The observed change in morphology as equivalence ratio is changed is described quantitatively in FIG. 10. A metric of nanotube quality, defined in this instance as the product of filament length and filaments counted in a TEM image divided by the image area covered by condensed material. High quality material by this metric would have many filaments of significant length within a matrix of minimal non-structured condensed material. A plot of this metric against equivalence ratio indicates quite clearly that nanotube quality improves dramatically as equivalence ratio moves from high (2.0+) to lower equivalence ratios. This trend reinforces the importance of using non-sooting flames to enhance the growth of filamental structures in the flame. Furthermore, the TEM insets and schematic plot give context to this phenomena relative to other flame parameters.

Material Characterization

Figure 5:
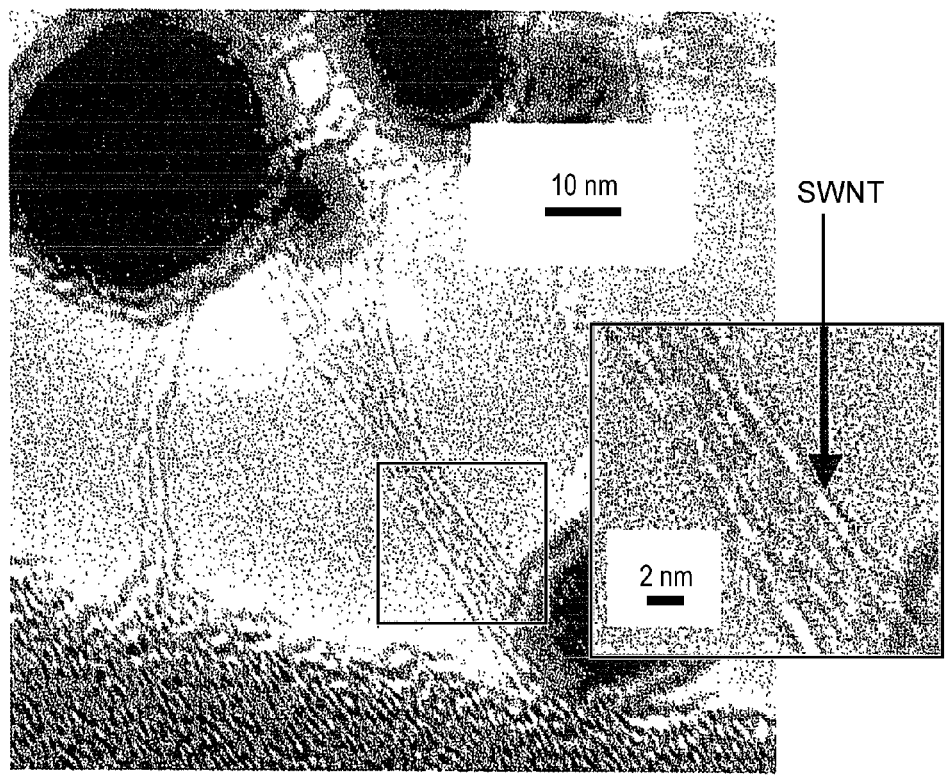
FIG. 5 is a TEM image showing a bundle of single-wall nanotubes.
Figure 6:
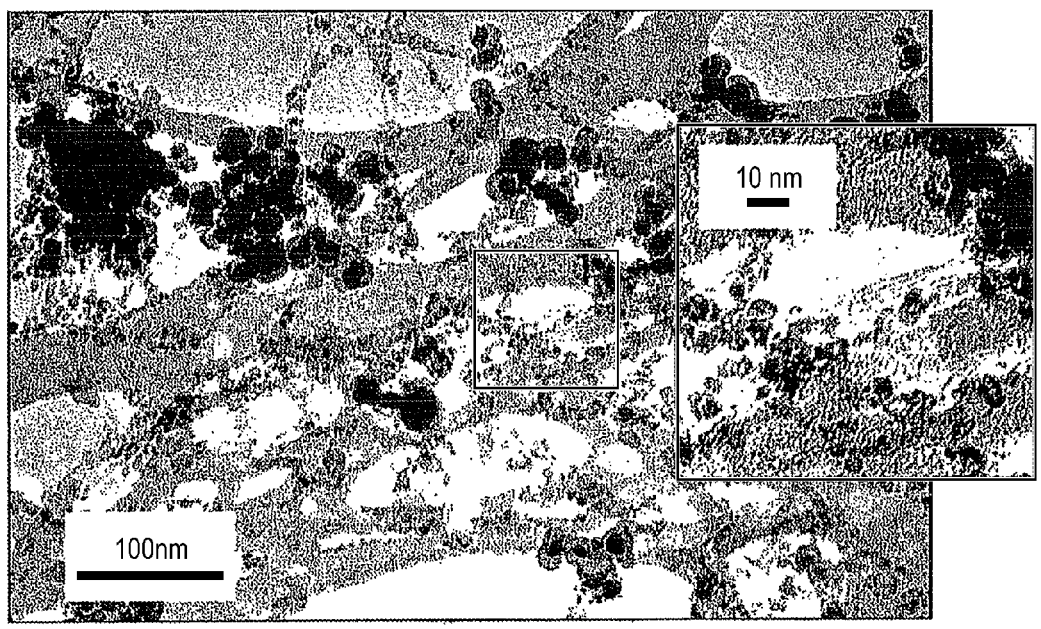
FIG. 6 is a TEM image collected from a water-cooled chamber wall of the burner of the invention.

Higher magnification TEM analysis shows that the condensed filamental material is predominantly bundles of single-wall nanotubes (FIG. 5). The structures shown in FIG. 5 resulted from an equivalence ratio of 1.6 with a HAB of 70 mm. The inset shows detail of a nanotube bundle with an outer wall shown in dark contrast. The flame synthesis process preferentially forms single-wall as opposed to multi-wall nanotubes. This observation is in agreement with other flame studies (43) and indicates a high degree of selectivity in the material synthesis despite the ensemble of competing processes occurring in the flame system. A TEM image for material collected from the water-cooled chamber wall (used for Raman measurements also) is shown in FIG. 6. Note the dominant features of nanotube bundles encrusted with agglomerates of carbon with internal metallic particles.

Figure 7:
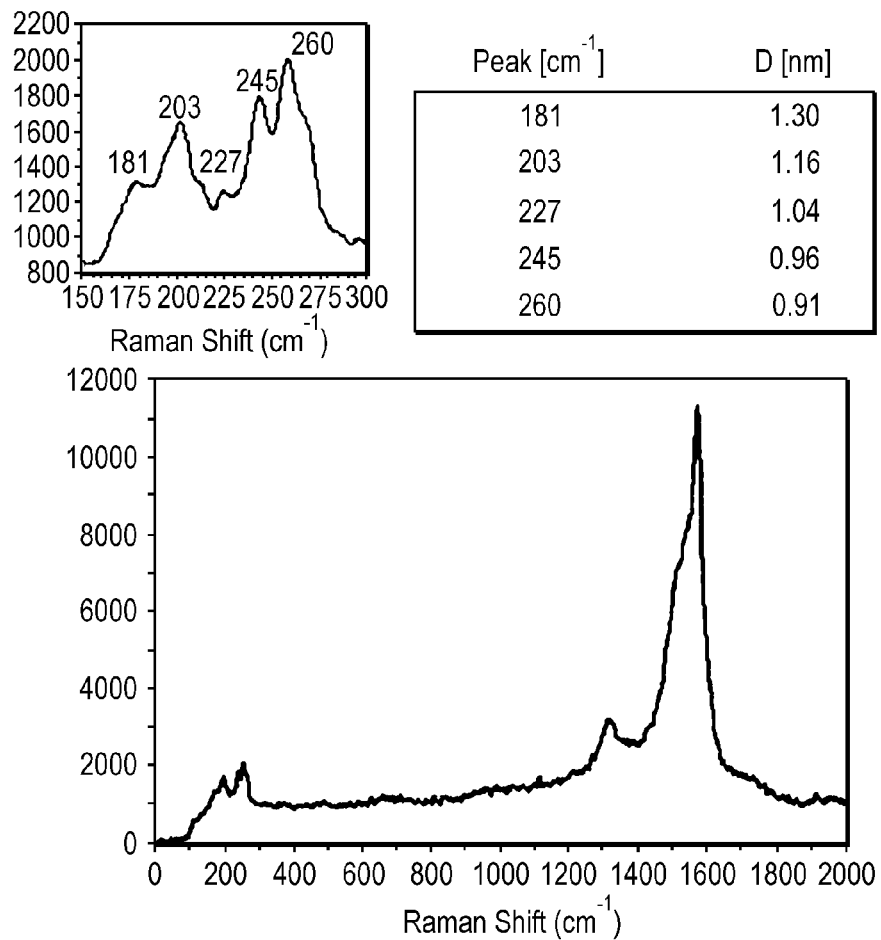
FIG. 7 is a graph of raman spectra for flame generated nanotube material.
Figure 8:
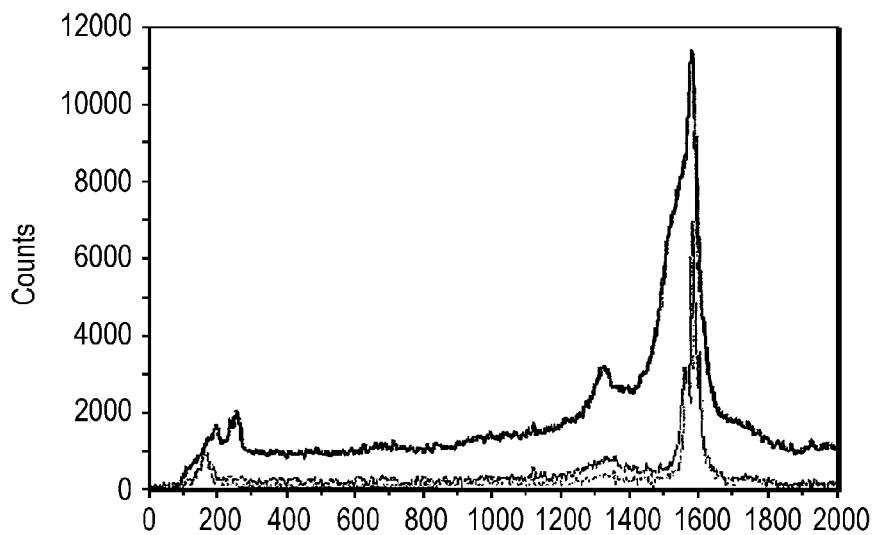
FIG. 8 is a graph comparing spectra for flame generated material and material derived from plasma-arc processes.

The Raman spectroscopy technique yielded a number of observations about the flame generated nanotube material. A typical Raman spectrum for flame generated material is shown in FIG. 7. Spectra for flame generated material (bold line) are compared to materials obtained from plasma arc processes (light grey lines) in FIG. 8. In FIG. 7, features centered around 200 $cm^{-1}$ are radial breathing modes corresponding to a range of single-walled nanotube diameters (approximately 0.9 to 1.3 nm). The shape of the large peak at 1590 $cm^{-1}$ relates to chirality effects. The Raman spectrum for the flame generated material shows a wide distribution of peaks corresponding to radial breathing modes (RBM). The corresponding range of tube diameters that generate this spectrum are between approximately 0.9 and 1.3 nm. When compared to the RBM modes obtained from the spectra of material generated with a plasma-arc technique, a difference in diameter distribution is clear. The flame generated material has a broader distribution of diameters and the diameters extend to smaller sizes. Other differences are apparent based on the shape of the G-band. The flame generated material has a significant 'hump' profile on the side of the G-band, with a peak at about 1330 $cm^{-1}$ and an apparent peak seen as a shoulder on the G-band, which is indicative of nanotube chirality (semiconducting or metallic). Compared to the plasma-arc generated material, the flame material appears to be more metallic in nature.

Figure 9:
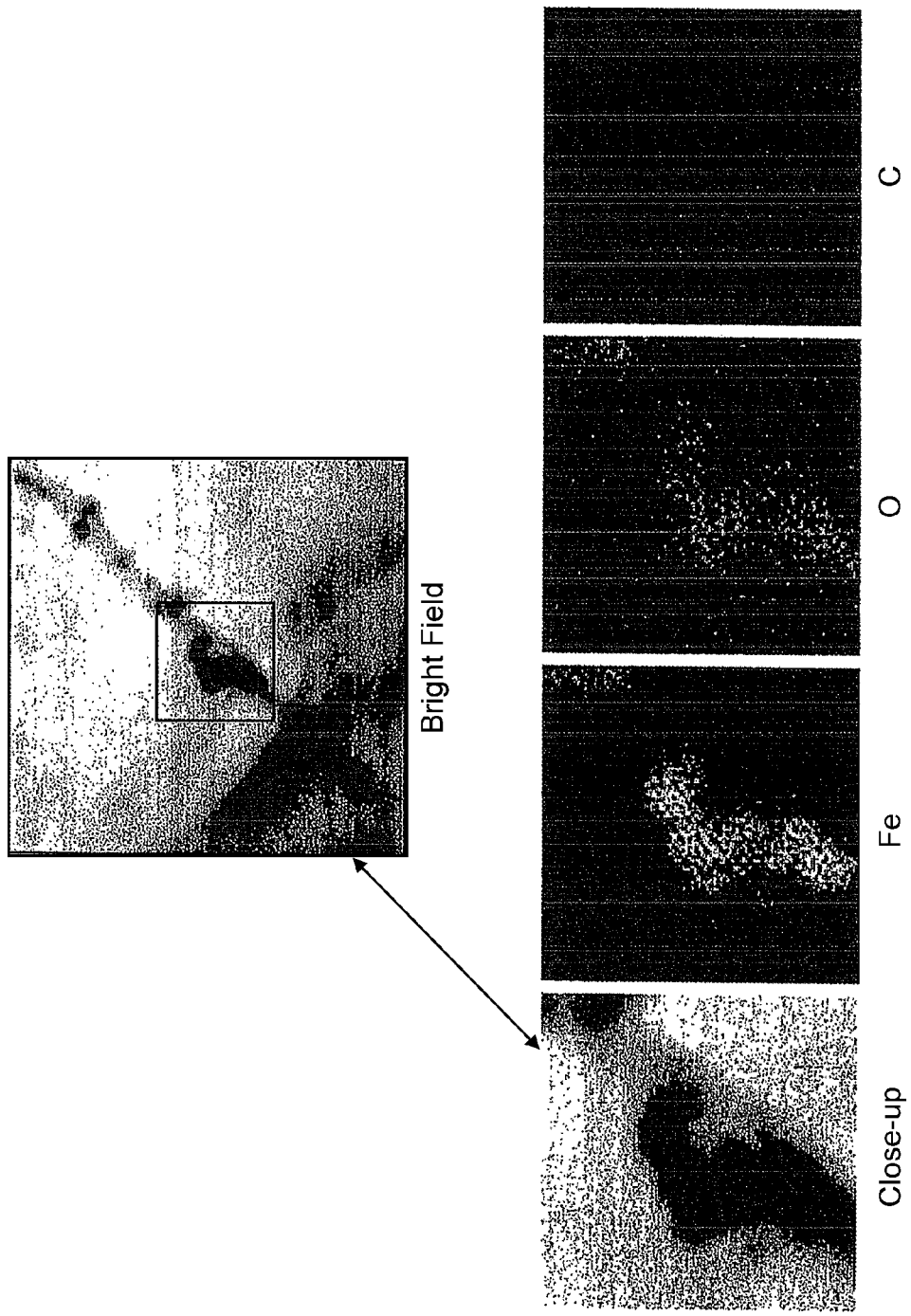
FIG. 9 are scanning transmission electron microscope (STEM) images of a particle associated with a bundle of single-wall carbon nanotubes.

Scanning transmission electron microscopy (STEM) was performed on material sampled directly from the flame as per the previously described TEM measurements. The composition of the particles associated with the carbon nanotubes is of particular interest and electron dispersive x-ray spectroscopy (EDXS) was used in scanning mode to obtain spatial maps of elemental intensity which could be compared to the STEM image in order to correlate composition with position. Images for this measurement on flame generated material are shown in FIG. 9. The STEM bright field image shows a bundle of single-wall carbon nanotubes with a dark particle agglomerate overlaying the bundle (apparently sitting next to rather than a part of the bundle). The elemental map for iron clearly shows a close correlation between the iron and the particle position, indicating the particle is composed largely of iron. The oxygen map also shows a correlation although at much lower intensity. The particle is most likely predominantly iron but may have a small oxide content. The carbon map shows rather poor contrast due to the bundle sitting on a carbon substrate yet an increased carbon intensity is observed in correlation with the nanotube bundle and around the particle. The particle associated with the nanotube bundle is likely composed of iron surrounded by non-structured carbon, as can also be observed in TEM images shown in FIGS. 5 and 6.

Nanotube Yield & Purity

The yield of nanotube material from the flame was estimated by a probe sampling technique and gravimetric analysis. A quartz tube (OD 11 mm, ID 9 mm), surrounded by a water cooled jacket, was inserted into the post-flame region with the mouth opening of the probe positioned 70 mm above the burner surface. The quartz tube was attached directly to a sintered metal filter assembly (Swagelok) that had been modified by placing a custom made disc of filter fabric (Balston, grade CQ) in-line before the metal filter disc. A vacuum pump was coupled to the filter to allow extraction of flame gases and flame-born condensed material through the probe and filter unit. Sampled gases were vented from the sample pump exhaust directly to a water column (gas collection bell) to allow determination of the volumetric concentration in the flame. After sampling the flame for a measured period of time, the filter disc was removed from the filter unit and weighed to determine the mass of material collected.

The amount of condensed material collected on the filter, scaled to the cross-section area of the burner face, over the sampling time (90 sec), gave the following estimates for condensed material yield per component of burner feed (per C fed: 1.1%; per Fe fed 24.8%; per $Fe(CO)_5$ fed 9.8%). Based on inspection of representative TEM micrographs for the flame sampled material (FIG. 6), it is estimated that roughly 50% of the image area covered by condensed material is associated with nanotubes (typically in the form of bundles) and this would equate roughly to a mass percentage of 10% or so. The yield of nanotubes relative to components fed to the burner can therefore be estimated as (per C fed 0.1%; per Fe fed 2.5%; per $Fe(CO)_5$ fed 1.0%). These estimated yields indicate that there are significant quantities of nanotubes generated in the flames described in this study, and would certainly amount to more than 1% of the condensed material.

Figure 11:
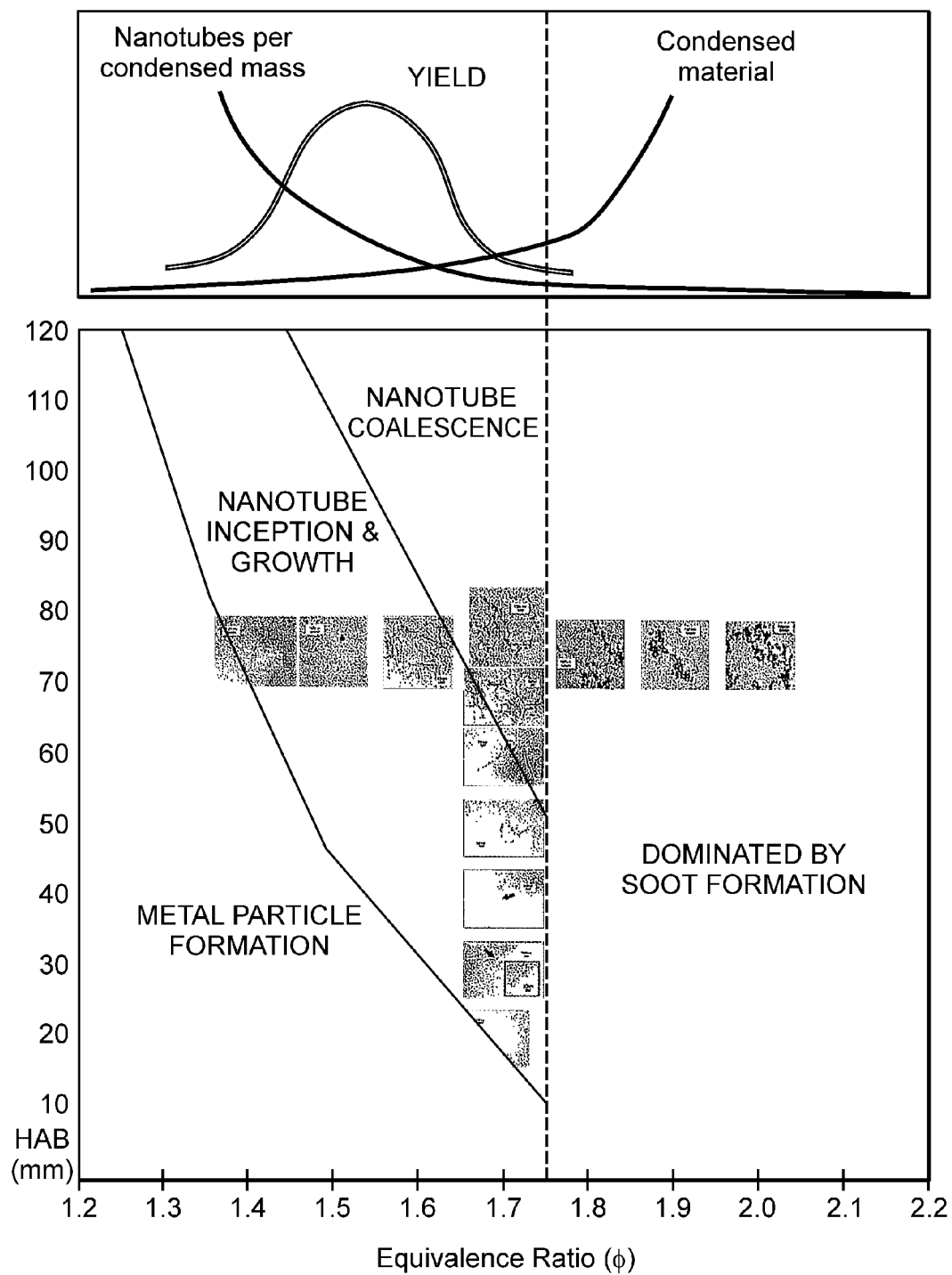
FIG. 11 is a graph, including TEM pictorial insets, illustrating how the non-sooting region enhances nanotube yield.

The effect of using non-sooting flames is illustrated in FIG. 10. Nanotube quality and yield as a proportion of condensed material clearly improves as equivalence ratios shift away from the sooting limit. Note that yield of the filamentary material peaks at an equivalence ratio of approximately 1.6. However, it is likely that higher yields may be obtained at lower equivalence ratios and higher HAB (or longer residence times) as is indicated in FIG. 11.

Single-walled nanotubes have thus been observed in a premixed acetylene/oxygen/argon flame operated at 50 Torr with iron pentacarbonyl vapor used as a source of metallic catalyst necessary for nanotube growth. A thermophoretic sampling method and transmission electron microscopy were used to characterize the solid material present at various heights above burner (HAB), giving resolution of formation dynamics within the flame system. Catalyst particle formation and growth is observed in the immediate post-flame region, 10 to 40 mm HAB, with coagulation leading to typical particle sizes on the order of 5 to 10 nm. Nanotubes were observed to be present after 40 mm (~34 ms) with nanotube inception occurring as early as 30 mm HAB (~25 ms). Between 40 and 70 mm HAB (period of approx. 30 ms), nanotubes are observed to form and coalesce into clusters. Based on the rapid appearance of nanotubes in this region, it appears that once initiated, nanotube growth occurs quite rapidly, on the order of 100 μm per second. A nanotube formation 'window' is evident with formation limited to fuel equivalence ratios between a lower limit of 1.5 and an upper limit of 1.9, although this range may extend to lower equivalence ratios in samples withdrawn from higher (or after more time) in the post-flame region. A continuum of morphologies ranging from relatively clean clusters of nanotubes to disordered material is observed between the lower and upper limits. The yield of nanotubes in the condensed material increases at compositions lower than the sooting limit.

It is recognized that modifications and variations of the invention disclosed herein will occur to those skilled in the art and it is intended that all of such modifications and variations be included within the scope of the appended claims.

What is claimed is:

1. A method for producing filamentary structures comprising:
    combusting a premixed mixture comprising hydrocarbon fuel and oxygen, in the presence of an unsupported catalyst, to establish a non-sooting flame and to produce the filamentary structures from the combusted hydrocarbon fuel and the unsupported catalyst in a post-flame region of the non-sooting flame while maintaining the non-sooting flame.

2. The method of claim 1 wherein residence time of the structures in the post-flame region extends up to 200 milliseconds.

3. The method of claim 1 further including a diluent.

4. The method of claim 3 wherein the diluent is argon.

5. The method of claim 1 further including quenching the filamentary structures.

6. The method of claim 5 wherein quenching includes injection of an inert fluid to quench by sensible energy, latent energy or chemical reaction.

7. The method of claim 1 wherein the filamentary structures comprise single-walled nanotubes.

8. The method of claim 1 wherein the filamentary structures comprise multi-walled nanotubes.

9. The method of claim 1 wherein the filamentary structures comprise fullerenic structures.

10. The method of claim 1 wherein the filamentary structures comprise carbon nanofibers.

11. The method of claim 1 wherein the filamentary structures comprise carbon structures decorated or in close association with metallic particles.

12. The method of claim 1 wherein the catalyst is a metal catalyst.

13. The method of claim 12 wherein the metal catalyst includes iron.

14. The method of claim 13 wherein the metal catalyst precursor is iron pentacarbonyl.

15. The method of claim 1 wherein the hydrocarbon fuel is acetylene.

16. The method of claim 1 wherein the catalyst is a mixture of different metals.

17. The method of claim 1 further including the step of withdrawing post-flame gases at locations corresponding to selected residence times to control the filamentary structure morphology.

18. The method of claim 1 wherein the filamentary structures are nanotubes having a diameter in the range 0.4 nm-100 nm.

19. The method of claim 1 wherein the filamentary structures comprise metallic nanotubes.

20. The method of claim 1 wherein the filamentary structures comprise semiconducting nanotubes.

21. The method of claim 1 further including injecting a secondary oxidant in the post-flame region so as to preferentially oxidize carbon and/or metallic contamination.

22. The method of claim 1 further including injecting a secondary reagent in the post-flame region so as to preferentially open, alter and/or functionalize the filamentary structures.

23. The method of claim 1 further including co-injecting or injection in a post-flame region modifying agents.

24. The method of claim 23 wherein the modifying agents are selected from the group consisting of ammonia, thiophene, hydrogen and carbon monoxide.

25. The method of claim 1 further including impressing an electric field on the flame or post-flame region of the flame to alter residence time profiles and/or particle trajectories and/or growth kinetics of particles to alter filamentary structure or morphology.

26. The method of claim 25 comprising impressing on the flame an electric field having a selected strength and having field lines substantially parallel to flame gas flow to induce preferential growth of the structures having either metallic or semiconductor chirality.

27. The method of claim 1 further including impressing an magnetic field on the flame or post-flame region of the flame to alter residence time profiles and/or particle trajectories, and/or growth kinetics of particles to alter filamentary structure or morphology.

28. The method of claim 1 further including impressing an electric and magnetic field on the flame or post-flame region of the flame to alter residence time profiles and/or particle trajectories, and/or growth kinetics of particles to alter filamentary structure or morphology.

29. The method of claim 1 further including impressing an electric and/or magnetic field with field lines perpendicular to the flow field in order to induce a separation of nanotubes or particles from the flame gases.

30. The method of claim 1 wherein equivalence ratio, catalyst type, and catalyst concentration are selected to establish the non-sooting flame.

31. The method of claim 1 wherein the hydrocarbon fuel and oxygen are in an equivalence ratio in the range 1.0-1.7.

* * * * *

UNITED STATES PATENT AND TRADEMARK OFFICE
CERTIFICATE OF CORRECTION

| | | |
|---|---|---|
| PATENT NO. | : 7,887,775 B2 | Page 1 of 1 |
| APPLICATION NO. | : 11/853921 | |
| DATED | : February 15, 2011 | |
| INVENTOR(S) | : Murray J. Height et al. | |

It is certified that error appears in the above-identified patent and that said Letters Patent is hereby corrected as shown below:

At col. 1, line 10, please insert:

--GOVERNMENT SUPPORT

This invention was made with Government support under Grant No. DE-FG02-84ER13282 awarded by the Department of Energy. The Government has certain rights in this invention.--

Signed and Sealed this
Twenty-first Day of June, 2011

David J. Kappos
*Director of the United States Patent and Trademark Office*